(12) United States Patent
Wagener et al.

(10) Patent No.: US 12,160,339 B2
(45) Date of Patent: Dec. 3, 2024

(54) GENERATING CONFIGURATION INFORMATION FOR NEWLY INTEGRATED FIELD DEVICES

(71) Applicant: ABB Schweiz AG, Baden (CH)

(72) Inventors: Dirk Wagener, Stadthagen (DE); Marcus Heege, Kaisersesch (DE); Christoph Welte, Neu-Ulm (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/332,866

(22) Filed: Jun. 12, 2023

(65) Prior Publication Data

US 2023/0403192 A1    Dec. 14, 2023

(30) Foreign Application Priority Data

Jun. 13, 2022  (EP) .................................... 22178612

(51) Int. Cl.
*H04L 41/0806*  (2022.01)
*H04L 67/12*  (2022.01)

(52) U.S. Cl.
CPC .......... *H04L 41/0806* (2013.01); *H04L 67/12* (2013.01)

(58) Field of Classification Search
CPC . H04L 41/0806; H04L 67/12; H04L 41/0866; H04L 41/084; H04L 63/102;
(Continued)

(56) References Cited

U.S. PATENT DOCUMENTS 10,244,043 B1 *  3/2019  Sato ..................... G06F 11/2025
11,017,375 B2 *  5/2021  Deshpande .......... G06Q 20/409
(Continued)

FOREIGN PATENT DOCUMENTS

DE       192997062914 B4 *  6/2009  .......... H04L 12/403
EP            3929673 A1    12/2021
WO       WO 2021/249655 A1   12/2021

OTHER PUBLICATIONS

Wollschlaeger et al., Integration of Fieldbus Systems into On-line Asset Management Solutions based on Fieldbus Profile Descriptions; Aug. 27, 2002; IEEE; pp. 89-96 (Year: 2002).*
(Continued)

*Primary Examiner* — Tonia L Dollinger
*Assistant Examiner* — Linh T. Nguyen
(74) *Attorney, Agent, or Firm* — Leydig, Voit & Mayer, Ltd.

(57) ABSTRACT

A method for generating configuration information for a new field device includes obtaining driver information that allows communication with the new field device and comprises new parameter information that identifies a parameter in the context of the new field device, obtaining a list of one or more semantic identifiers, determine existing field device parameters with which the semantic identifier is already associated in the industrial plant, obtain existing parameter information, evaluate to which extent existing parameter information matches new parameter information with respect to a parameter of the new field device, and based on this evaluated extent, associate the semantic identifier with the parameter of the new field device as part of the sought configuration information for the new field device.

10 Claims, 2 Drawing Sheets

(58) Field of Classification Search
CPC ............... H04L 41/0809; H04L 67/303; G06F 16/24578; G06F 16/955; G06F 18/2113
See application file for complete search history.

(56) References Cited

U.S. PATENT DOCUMENTS

| | | | |
|---|---|---|---|
| 11,240,326 B1* | 2/2022 | Khanwalkar | H04L 67/303 |
| 2009/0276486 A1* | 11/2009 | Tandon | G05B 19/4185 |
| | | | 710/8 |
| 2012/0035746 A1* | 2/2012 | Broom | G06Q 10/087 |
| | | | 700/21 |
| 2012/0303144 A1 | 11/2012 | Grossmann et al. | |
| 2015/0066162 A1 | 3/2015 | Hokeness et al. | |
| 2016/0291563 A1* | 10/2016 | Kumar | H04L 67/303 |
| 2018/0348725 A1 | 12/2018 | Baret et al. | |
| 2019/0190781 A1* | 6/2019 | Weide | H04L 41/142 |
| 2019/0286098 A1* | 9/2019 | Weng | G06F 16/26 |
| 2021/0173355 A1* | 6/2021 | Tang | H04L 43/065 |
| 2021/0241175 A1* | 8/2021 | Harang | G06F 18/2178 |
| 2021/0265839 A1* | 8/2021 | Davis | H02J 13/00002 |
| 2021/0286346 A1* | 9/2021 | Braun | G05B 19/41855 |
| 2021/0406037 A1 | 12/2021 | Wagener et al. | |
| 2021/0406805 A1* | 12/2021 | King | G06Q 10/105 |

OTHER PUBLICATIONS

European Patent Office, Extended European Search Report in European Patent Application No. 22178612.2, 8 pp. (Nov. 24, 2022).

* cited by examiner

GENERATING CONFIGURATION INFORMATION FOR NEWLY INTEGRATED FIELD DEVICES

CROSS-REFERENCE TO RELATED APPLICATIONS

The instant application claims priority to European Patent Application No. 22178612.2, filed Jun. 13, 2022, which is incorporated herein in its entirety by reference.

FIELD OF THE DISCLOSURE

The present disclosure generally relates to the configuration of field devices for industrial plants in which semantic identifiers are used to access field device parameters.

BACKGROUND OF THE INVENTION

Industrial plants for executing industrial processes comprise a plurality of field devices that are connected to a distributed control system, DCS, via a network of the industrial plant. Field devices need to be configured before they can perform their intended function in the industrial plant. WO 2021/249 655 A1 discloses a method to configure a field device based on an OPC UA server of an already configured field device of the same type.

As it is disclosed in EP 3 929 673 A1, parameters of field devices may be labelled with semantic identifiers, such that these parameters can be referenced and accessed by the DCS using these semantic identifiers in a unified manner. That is, even though one and the same parameter may be named and accessed differently on different field devices, it is available on every field device under its semantic identifier.

For this to work, a mapping between semantic identifiers on the one hand and field device parameters of the field devices on the other hand needs to be established as configuration information that relates to the respective field device. This mapping is usually performed manually.

BRIEF SUMMARY OF THE INVENTION

The present disclosure describes systems and methods that at least partially automate the mapping between semantic identifiers on the one hand and field device parameters of a field device that is to be newly integrated into an industrial plant.

The disclosure describes a computer-implemented method for generating configuration information for a new field device type that is to be integrated into an industrial plant. In particular, the sought configuration information comprises mappings (associations) between semantic identifiers that are already being used in the context of the plant on the one hand, and field device parameters of the new field device on the other hand. That is, the term "configuration information" is not to be construed limiting in the sense that this information is for being written onto the new field device. Rather, it comprises any information that defines the interaction between the industrial plant and the new field device.

In the course of the method, driver information and/or software for the new field device is obtained. This driver information and/or software allows communication with the field device and comprises new parameter information for each field device parameter of the new field device. The new parameter information that relates to a particular parameter identifies this parameter in the context of the new field device, and/or is indicative of how this parameter may be set. For example, the new parameter information may comprise a name or other identifier by which the parameter may be referenced, and/or handles for methods or functions with which the parameter may be accessed or manipulated. Using driver information and/or software for the new field device to determine the available parameters has the advantage that the generating of configuration information can be performed without having a physical instance of the new field device. However, the driver information and/or software may also be queried from such a physical instance if such an instance is available, such as by means of a programmatic call to enumerate the field device parameters. Thus, the term "driver information and/or software" includes but is not limited to a software package that is conveyed separately from a physical instance of the new field device.

A list of one or more semantic identifiers is obtained. These semantic identifiers are used in the industrial plant to designate field device parameters. Herein, "used in the industrial plant" is not to be construed limiting in the sense that the industrial plant already needs to exist physically. Rather, the proposed method may also be used during the planning of the industrial plant. The list of semantic identifiers may, for example, be obtained from a distributed control system, DCS, or an asset management system, AMS, of the industrial plant.

For each semantic identifier on the list, field device parameters for which the semantic identifier is already associated in the industrial plant are determined. That is, out of the many field devices in the industrial plant (or a plan or a digital twin thereof), there may be one or more field devices with a parameter that has already been tagged with the semantic identifier. For example, for the semantic identifier "pressure setpoint", there may be a mapping to a parameter "p_set" on a first field device, to a parameter "Pressure_Set" on a second field device, and to a parameter "P1" on a third field device, all of which signify the pressure setpoint of the respective field device. The field device parameters may, for example, be obtained from the DCS or AMS as well.

For each so-determined field device parameter, existing parameter information stored in association with it is obtained. This existing parameter information identifies the respective parameter in the context of the respective field device, and/or is indicative of how this parameter is to be set. For example, as mentioned before, the names "p_set, "Pressure_Set" and "P1" each identify the pressure setpoint in the context of the first, second and third field device, respectively. The existing parameter information may, for example, be obtained from the DCS or AMS. But it may also be queried from the respective field device.

It is then evaluated to which extent existing parameter information matches new parameter information with respect to a parameter of the new field device. Based on this evaluated extent, the semantic identifier is associated with this parameter of the new field device as part of the sought configuration information for the new field device.

In a simple example, if the new field device has a parameter named "Pressure_Set" that exactly matches the name "Pressure_Set" for a parameter of the second device which is already associated with the semantic identifier "pressure set-point", it is not certain, but highly probable, that the parameter "Pressure_Set" of the new field device will also signify a pressure set-point. The probability is even higher if the second field device and the new field device are from the same manufacturer and of the same type.

Which degree of matching between existing parameter information and new parameter information is required for the decision to associate the same semantic identifier that is already associated with a parameter of an existing field device also to a new parameter of the new field device is freely selectable. In the following, examples will be given as to how this decision can be made given that there is a degree of uncertainty whether the existing and new parameters really have the same semantic meaning. Also, it will be detailed how it can be determined with near-certainty or even complete certainty that a parameter of the new field device really has the same semantic meaning as a parameter of the existing field device that is already tagged with the semantic identifier corresponding to the semantic meaning.

The main advantage of the proposed method is that existing associations between semantic identifiers on the one hand, and field device parameters on the other hand, may be re-used in an automated manner. Wherever it can be determined that a new field device parameter has the same semantic meaning as an existing field device parameter with which a semantic identifier is already associated, this semantic identifier can be assigned to the new field device parameter as well. In this manner, manual work for configuring these associations may be saved, and errors to which this manual work is prone may be avoided.

Also, the method is self-learning. Once an association of a semantic label with a new field device parameter of a new field device has been automatically established, the new field device may become an existing field device, and when the next field device is to be integrated, the field device parameters newly associated with the semantic identifier may be used as existing field device parameters.

The mentioned advantages are not "on-off" effects that depend on whether all parameters of the new field devices may be associated with semantic identifiers somehow. First, every single new parameter of the new field device that may be associated with a semantic identifier already makes a contribution to this effect. Second, in a typical setting in an industrial plant, not all parameters of all field devices are associated with some semantic identifier.

BRIEF DESCRIPTION OF THE SEVERAL VIEWS OF THE DRAWING(S)

DETAILED DESCRIPTION OF THE INVENTION

Figure 1:
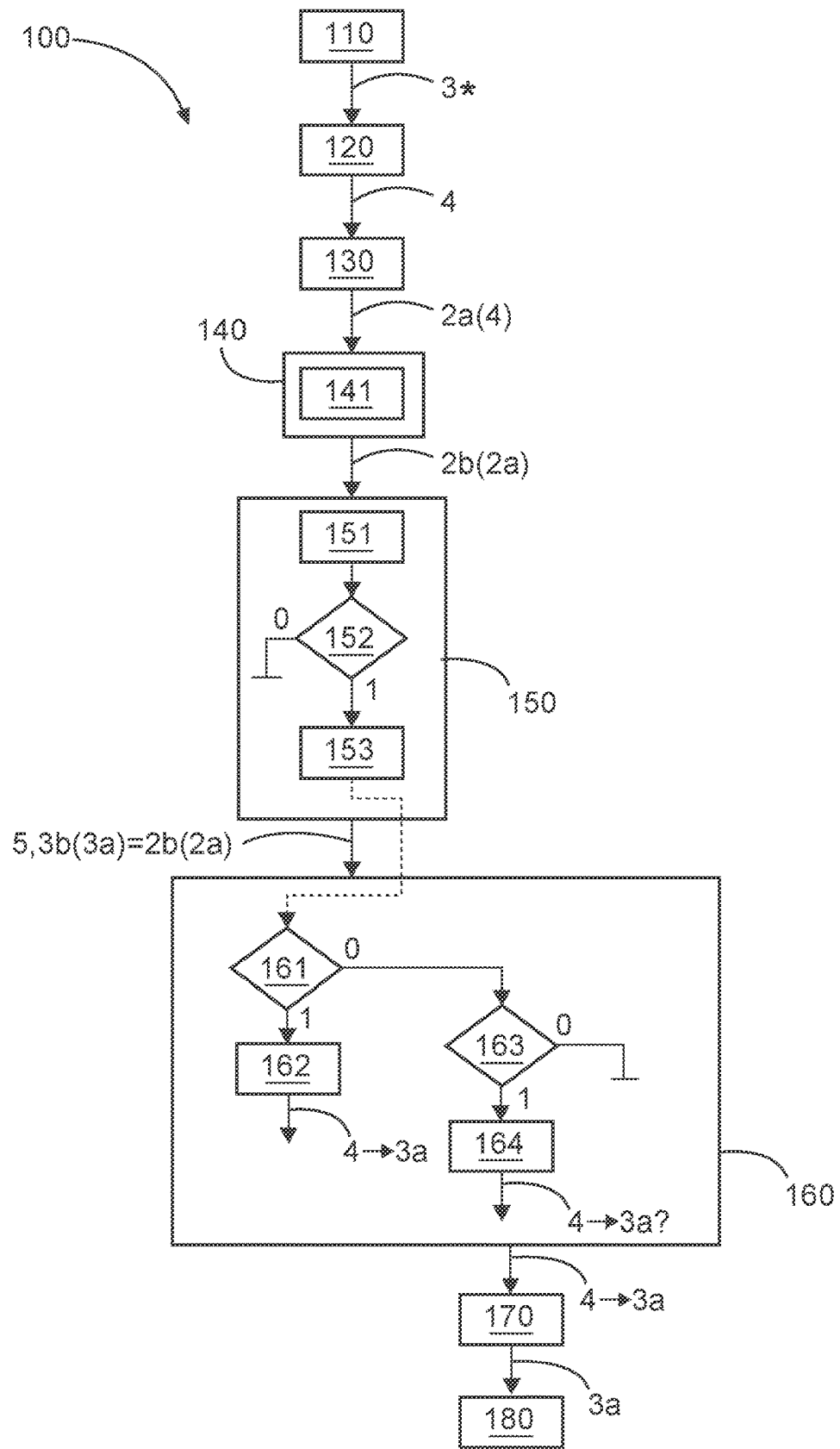
FIG. 1 is a flowchart for a method in accordance with the disclosure.
Figure 2:
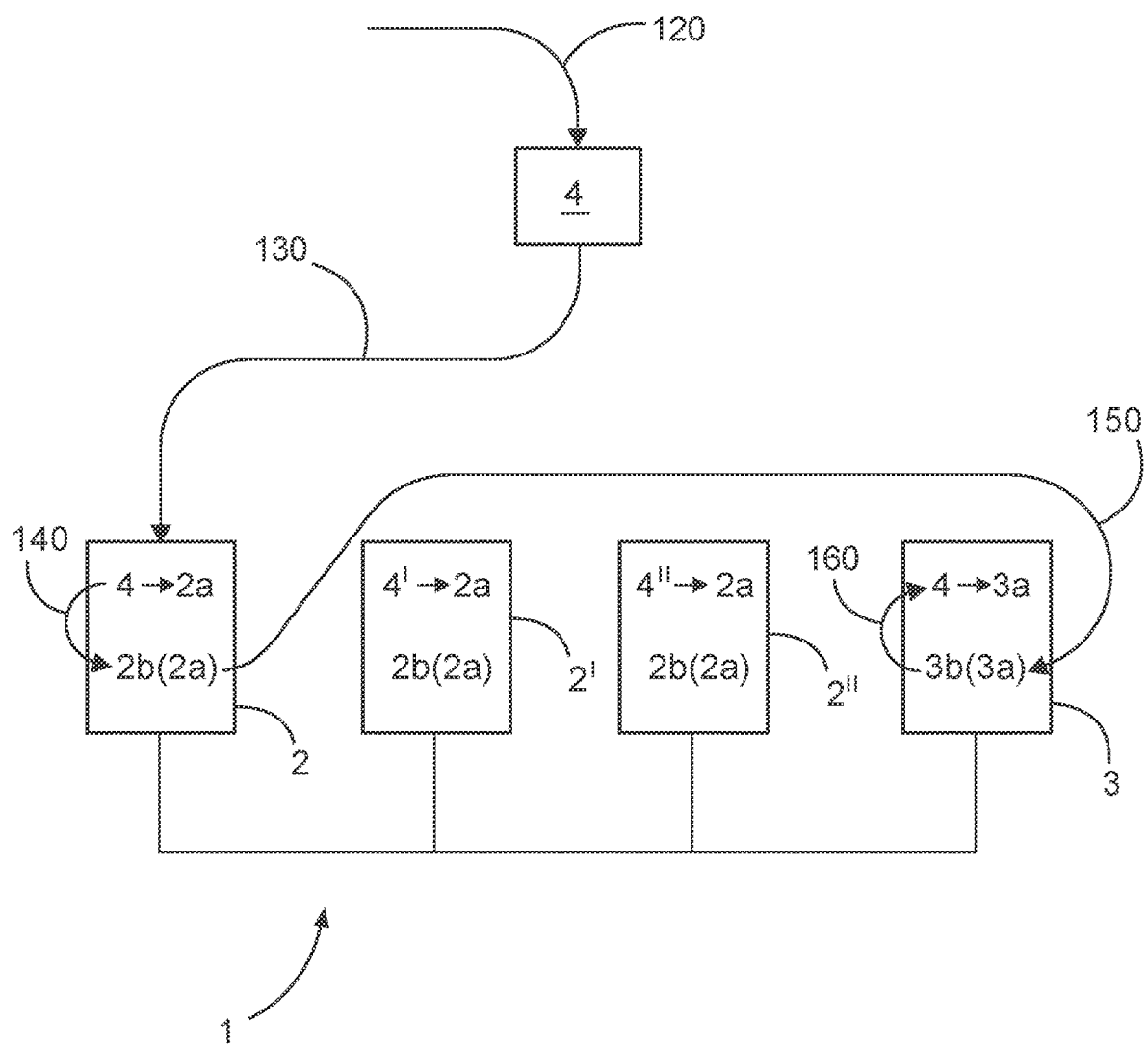
FIG. 2 illustrates a process in accordance with the disclosure.

FIG. 1 shows an exemplary embodiment of a method 100 for generating configuration information for a new field device 3. FIG. 2 illustrates deriving of new configuration information for a new field device 3 that is to be integrated into a given industrial plant 1.

FIG. 1 is a schematic flow chart of an exemplary embodiment of the method 100 for generating configuration information for a new field device 3 in the form of a new association of a semantic identifier 4 to a parameter 3a of this new field device 3.

In step 110, driver information and/or software 3* that allows communication with the new field device 3 is obtained. The new field device 3 has field device parameters 3a, and for each such field device parameter 3a, the driver information and/or software 3* contains new parameter information 3b that identifies this parameter 3a in the context of the new field device 3, and/or is indicative of how this parameter 3a may be set.

In step 120, a list of one or more semantic identifiers 4 that are used in the industrial plant 1 to designate field device parameters 2a in existing field devices 2 is obtained. In step 130, it is determined with which existing field device parameters 2a the semantic identifier 4 is already associated in the industrial plant 1. In step 140, existing parameter information 2b stored in association with these existing field device parameters 2a is obtained. According to block 141, this parameter information 2b may comprise details of the communication mechanism to be used to set a parameter 2a from a mandatory specification of a communication standard that governs the field device 2.

In step 150, it is evaluated to which extent 5 existing parameter information 2b matches new parameter information 3b with respect to a parameter 3a of the new field device 3. In step 160, based on this evaluated extent 5, the semantic identifier 4 that is already associated with the parameter 2a in the existing field device 2 is deemed to be appropriate for the new parameter 3a of the new field device 3 as well. Therefore, the semantic identifier 4 is associated with the new parameter 3a as part of the sought configuration information for the new field device 3.

According to block 151, a set of criteria for the match between the existing parameter information 2b and the new parameter information 3b may be provided. Each such criterion is associated with a confidence level for the match, and/or with an increase or decrease of this confidence level. According to block 152, it may then be checked whether each criterion is fulfilled. In response to a criterion being fulfilled, according to block 153, the confidence level, and/or the increase or decrease of the confidence level, associated with the criterion may then be applied.

According to block 161, it may be checked whether the confidence level exceeds a first threshold value. If this is the case (truth value 1), according to block 162, the semantic identifier 4 may be associated with the parameter 3a of the new field device 3. If the first threshold value is not exceeded (truth value 0 at block 161), it may be checked, according to block 163, whether a second threshold value that is lower than the first threshold value is exceeded. If this is the case (truth value 1), according to block 164, an operator may be prompted for a decision whether to associate the semantic identifier 4 with the parameter 3a of the new field device 3. The steps 130 to 160 may be repeated for every semantic identifier 4 in the list obtained in step 120.

In step 170, a distributed control system, DCS, of the industrial plant 1 may obtain the new field device parameter 3a as a to-be-set field device parameter of the new field device 3, based on the association of the semantic identifier 4 with the new field device parameter 3a in the newly created configuration information. That is, the DCS knows that a parameter with a certain given semantic identifier 4 on a given field device 3 is to be set and learns from the newly established association of this semantic identifier 4 with the new field device parameter 3a that this new field device parameter 3a is the to-be-set parameter. In step 180, the DCS sets this to-be-set parameter to a value determined by the DCS.

FIG. 2 illustrates how a semantic identifier 4 that is already in use in an industrial plant 1 can be automatically associated with a new parameter 3a of a new field device 3. In the example shown in FIG. 2, the industrial plant 1 already comprises three existing field devices 2, 2' and 2". Each existing field device 2, 2', 2" has a respective existing field device parameter 2*a* and corresponding existing parameter information 2*b*. The existing parameter information 2*b* identifies the respective parameter 2*a* in the context of the respective existing field device 2, 2', 2", and/or is indicative of how this parameter 2*a* is to be set.

The field device parameters 2*a* of the existing field devices 2, 2' and 2" are already associated with semantic identifiers 4, 4' and 4", respectively. Step 120 of the method 100 yields the semantic identifier 4 on a list of all semantic identifiers 4, 4', 4" used in the industrial plant 1. In step 130, it is determined that the semantic identifier 4 is already associated with the existing field device parameter 2*a* of the existing field device 2.

Step 140 yields the existing field device parameter information 2*b* stored in association with the existing field device parameter 2*a*. In step 150, it is determined that this existing field device parameter information 2*b* matches new field device parameter information 3*b* that is stored in association with a new field device parameter 3*a* of the new field device 3. This indicates that the semantic identifier 4, which is already used for the existing field device parameter 2*a* of the existing field device 2, is also valid for the new field device parameter 3*a* of the new field device 3. Consequently, in step 160, the semantic identifier 4 is associated with this new field device parameter 3*a*. This association is part of the configuration information for the new field device 3.

In a particularly advantageous embodiment, the parameter information that is compared between the existing parameter of the existing field device that is already associated with the semantic identifier on the one hand, and the new parameter of the new field device on the other hand, comprises details of the communication mechanism to be used to set the parameter. This information relates to what is actually done on the field device, rather than to arbitrarily given names. Therefore, if such details match, there is a rather high probability that the existing parameter and the new parameter have the same semantic meaning and thus deserve the same semantic identifier.

For example, the details of the communication may comprise a HART command, and/or a Profibus slot and index, to be used to set the parameter. There is a one-to-one mapping between HART commands and Profibus slot-index combinations on the one hand, and field device parameters on the other hand.

In a particularly advantageous embodiment, the details of the communication mechanism to be used to set the parameter are chosen from a mandatory specification of a communication standard that governs the field device. For example, both the specification of HART and the specification of Profibus prescribe that in every standard-compliant field device, parameters from a certain catalogue are to be set using the same means and methods of communication. This is in some way analogous to the requirement that certain controls of cars are required to be operable in the same manner in every car. For example, the accelerator pedal is always the right-most pedal, and to the immediate left of it, there is the brake pedal. If a clutch pedal is present, it is to the left of the brake pedal. No car in which the arrangement of pedals is different is approved for road traffic. If the existing parameter of the existing field device is in said prescribed catalogue, and the new parameter of the new field device is to be set in the same manner, it can be determined for certain that the new parameter has the same semantic meaning as the existing parameter.

Therefore, in a particularly advantageous embodiment, if the details of the communication mechanism in the new parameter information for a new parameter of the new field device fully match the details of the communication mechanism in the existing parameter information for an existing parameter that is already associated with a semantic identifier, this semantic identifier is associated with the new parameter of the new field device.

The parameter information contains more items that can be exploited for determining whether the existing parameter of the existing field device on the one hand, and the new parameter of the new field device on the other hand, have the same semantic meaning. In particular, the parameter information may comprise a parameter name by which the parameter can be accessed programmatically (such as by calling an application programming interface, API), and/or a parameter label associated with the parameter in a user interface of, e.g., an asset management system, AMS, or a distributed control system, DCS, of the industrial plant. A match in labels provides a higher confidence that the semantic meanings of the existing parameter and of the new parameter also match, as device manufacturers strive to present parameters to end users in a uniform and easily understandable manner. A match need not be an exact match. For example, a match can also be determined if only parts of the names or labels match, and these parts do not occur in any other parameter names or labels.

Unlike details of the communication mechanism for a standardized parameter, names and labels as parameter information cannot serve to determine with certainty that the semantic meanings match. With names and labels, one source of uncertainty is that the same name or label may have different meanings in the contexts of field devices of different types. For example, the parameter "gain" may refer to a gain applied to an input in the context of a first field device, and to a gain applied to an output in the context of a second field device. Therefore, in a further particularly advantageous embodiment, a framework is established for handling uncertainty and varying confidence levels.

According to this embodiment, a set of criteria is provided for the match between the existing parameter information and the new parameter information. Each criterion is associated with a confidence level for the match, and/or with an increase or decrease of this confidence level. It is then checked whether each criterion is fulfilled. In response to a criterion being fulfilled, the confidence level, and/or the increase or decrease of the confidence level, associated with the criterion is applied.

For example, if names, labels or parts of names or labels for a parameter match, this may be rewarded with a base confidence level that this match actually indicates a match between the semantic meanings of the existing parameter and the new parameter. Optionally, this base confidence level may increase with the length of the matching names, labels, or parts. For example, a match of "P1" has a higher chance of being a mere coincidence than a match of "Pressure_Set". Other criteria may then, for example, stipulate that if the manufacturer of the new field device is the same as the manufacturer of the existing field device that has the parameter to which the semantic identifier is already associated, and/or the type of the new field device is the same as the type of the existing field device that has the parameter to which the semantic identifier is already associated, the confidence level is increased.

In particular, it can be expected that one manufacturer will follow one nomenclature in a consistent manner, even across devices of different types. Also, if the existing field device is of the same type as the new field device, it is likely that parameters with same semantic meanings are named alike.

As another example, the set of criteria may comprise at least the criterion that if a same parameter is associated with the semantic identifier with respect to multiple field devices, the confidence level is increased. In this manner, a mislabeling of an existing field device parameter with a semantic identifier is less likely to cause association of a new field device parameter with a wrong semantic identifier. Such mislabeling may, for example, happen if the taxonomy of the semantic identifiers is very fine-grained.

In a particularly advantageous embodiment, in response to determining that the confidence level exceeds a first threshold value, the semantic identifier is associated with the new field device parameter whose new parameter information matches the existing parameter information of the existing field device parameter. That is, by virtue of the association of the semantic identifier with the existing field device parameter in combination with the sufficient confidence level, the semantic identifier is deemed to be proper for the new field device parameter of the new field device as well.

Optionally, if the confidence level does not exceed the first threshold value but exceeds a second threshold value that is lower than the first threshold value, an operator may be prompted for a decision whether to associate the semantic identifier with the parameter of the new field device.

In a further advantageous embodiment, a distributed control system, DCS, of the industrial plant determines the new field device parameter as a to-be-set field device parameter of the new field device based on the association of the semantic identifier with the new field device parameter in the configuration information that has been determined by the proposed method. The DCS then sets this to-be-set parameter to a value determined by the DCS.

That is, the DCS determines, by means of the control routine it is executing, that a parameter of the new field device with a given semantic identifier is to be set to a certain value. For example, the control routine may stipulate that the parameter with the semantic meaning "pressure setpoint" is to be set to 5.1 bar. According to the method described above, it has been automatically determined which parameter of this field device corresponds to the semantic meaning "pressure setpoint" and therefore deserves this semantic identifier. Therefore, the DCS can use the semantic identifier "pressure setpoint" to set this parameter, without needing to know further details about the new field device.

In particular, this facilitates an exchange of one field device with a new field device. Even though the parameter that corresponds to the pressure set-point may need to be accessed in a manner that is different from the old device, the DCS can continue using the semantic identifier "pressure set-point" to set the parameter.

Because it is computer-implemented, the present method may be embodied in the form of a software. The invention therefore also relates to a computer program with machine-readable instructions that, when executed by one or more computers and/or compute instances, cause the one or more computers and/or compute instances to perform the method described above. Examples for compute instances include virtual machines, containers or serverless execution environments in a cloud. The invention also relates to a machine-readable data carrier and/or a download product with the computer program. A download product is a digital product with the computer program that may, e.g., be sold in an online shop for immediate fulfilment and download to one or more computers. The invention also relates to one or more compute instances with the computer program, and/or with the machine-readable data carrier and/or download product.

All references, including publications, patent applications, and patents, cited herein are hereby incorporated by reference to the same extent as if each reference were individually and specifically indicated to be incorporated by reference and were set forth in its entirety herein.

LIST OF REFERENCE SIGNS 1 industrial plant
2, 2', 2" existing field devices
2a parameter of existing field device 2, 2', 2"
2b parameter information stored in association with parameter 2a
3 new field device
3* driver information and/or software for new field device 3
3a parameter of new field device 3
3b parameter information stored in association with parameter 3a
4, 4', 4" semantic identifiers for field device parameters 2a, 3a
5 extent of match between parameters 2b, 3b
100 method for generating configuration information for field device 3
110 obtaining driver information and/or software 3*
120 obtaining list of semantic identifiers 4
130 determining existing field device parameters 2a
140 obtaining parameter information 2b for parameters 2a
150 evaluating match extent 5 between parameter information 2b and 3b
151 providing set of criteria for match
152 checking whether each criterion is fulfilled
153 applying confidence level and/or increase or decrease thereof
160 associating semantic identifier 4 with field device parameter 3a
161 determining that confidence level exceeds first threshold
162 associating semantic identifier 4 with field device parameter 3a
163 determining that confidence level exceeds second threshold
164 prompting operator for decision to associate semantic identifier 4
170 determining parameter 3a based on semantic identifier 4
180 setting parameter 3a to value determined by DCS The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for generating configuration information for a new field device that is to be integrated into an industrial plant, comprising:
    obtaining driver information and/or software that allows communication with the new field device and comprises, for each field device parameter of the new field device, new parameter information that identifies this parameter in the context of the new field device, and/or is indicative of how this parameter may be set;
    obtaining a list of one or more semantic identifiers that are used in the industrial plant to designate field device parameters, and for each such semantic identifier:
    determining existing field device parameters with which the semantic identifier is already associated in the industrial plant;
    obtaining existing parameter information stored in association with these existing field device parameters, wherein this existing parameter information identifies the respective parameter in the context of the respective existing field device, and/or is indicative of how this parameter is to be set;
    evaluating to which extent existing parameter information matches new parameter information with respect to a parameter of the new field device;
    based on this evaluated extent, associating the semantic identifier with this parameter of the new field device as part of the sought configuration information for the new field device;
    in response to determining that the confidence level exceeds a first threshold value, associating the semantic identifier with the parameter of the new field device; and
    in response to determining that the confidence level does not exceed the first threshold value, but exceeds a second threshold value that is lower than the first threshold value, prompting an operator for a decision whether to associate the semantic identifier with the parameter of the new field device,
    wherein the evaluating to which extent existing parameter information matches new parameter information for a parameter comprises:
    providing a set of criteria for the match between the existing parameter information and the new parameter information, wherein each criterion is associated with a confidence level for the match, and/or with an increase or decrease of this confidence level;
    checking whether each criterion is fulfilled; and
    in response to a criterion being fulfilled, applying the confidence level, and/or the increase or decrease of the confidence level, associated with the criterion.

2. The method of claim 1, wherein the parameter information comprises details of a communication mechanism to be used to set the parameter.

3. The method of claim 2, wherein the details of the communication mechanism comprise a HART command, and/or a Profibus slot and index, to be used to set the parameter.

4. The method of claim 2, wherein the details of the communication mechanism to be used to set the parameter are chosen from a mandatory specification of a communication standard that governs the field device.

5. The method of claim 4, wherein, when the details of the communication mechanism in the new parameter information for a new parameter of the new field device fully match the details of the communication mechanism in the existing parameter information for an existing parameter that is already associated with a semantic identifier, this semantic identifier is associated with the new parameter of the new field device.

6. The method of claim 1, wherein the parameter information comprises a parameter name by which the parameter can be accessed programmatically, and/or a parameter label associated with the parameter in a user interface.

7. The method of claim 1, further comprising:
    determining, by a distributed control system, DCS, of the industrial plant, based on the association of the semantic identifier with the new field device parameter in the configuration information, the new field device parameter as a to-be-set field device parameter of the new field device; and
    setting, by the DCS, this to-be-set parameter to a value determined by the DCS.

8. The method of claim 1, wherein the semantic identifiers are chosen such that one and the same parameter is available on different field devices under its same semantic identifier even if it is named and accessed differently on the different field devices.

9. A computer-implemented method for generating configuration information for a new field device that is to be integrated into an industrial plant, comprising:
    obtaining driver information and/or software that allows communication with the new field device and comprises, for each field device parameter of the new field device, new parameter information that identifies this parameter in the context of the new field device, and/or is indicative of how this parameter may be set;
    obtaining a list of one or more semantic identifiers that are used in the industrial plant to designate field device parameters, and for each such semantic identifier:
    determining existing field device parameters with which the semantic identifier is already associated in the industrial plant;
    obtaining existing parameter information stored in association with these existing field device parameters, wherein this existing parameter information identifies the respective parameter in the context of the respective existing field device, and/or is indicative of how this parameter is to be set;

evaluating to which extent existing parameter information matches new parameter information with respect to a parameter of the new field device; and based on this evaluated extent, associating the semantic identifier with this parameter of the new field device as part of the sought configuration information for the new field device, wherein the evaluating to which extent existing parameter information matches new parameter information for a parameter comprises:

providing a set of criteria for the match between the existing parameter information and the new parameter information, wherein each criterion is associated with a confidence level for the match, and/or with an increase or decrease of this confidence level;

checking whether each criterion is fulfilled; and in response to a criterion being fulfilled, applying the confidence level, and/or the increase or decrease of the confidence level, associated with the criterion, and wherein the set of criteria comprises at least the criterion that when the manufacturer of the new field device is the same as the manufacturer of the existing field device that has the parameter to which the semantic identifier is already associated, and/or the type of the new field device is the same as the type of the existing field device that has the parameter to which the semantic identifier is already associated, the confidence level is increased.

10. A computer-implemented method for generating configuration information for a new field device that is to be integrated into an industrial plant, comprising:

obtaining driver information and/or software that allows communication with the new field device and comprises, for each field device parameter of the new field device, new parameter information that identifies this parameter in the context of the new field device, and/or is indicative of how this parameter may be set;

obtaining a list of one or more semantic identifiers that are used in the industrial plant to designate field device parameters, and for each such semantic identifier:

determining existing field device parameters with which the semantic identifier is already associated in the industrial plant;

obtaining existing parameter information stored in association with these existing field device parameters, wherein this existing parameter information identifies the respective parameter in the context of the respective existing field device, and/or is indicative of how this parameter is to be set;

evaluating to which extent existing parameter information matches new parameter information with respect to a parameter of the new field device; and based on this evaluated extent, associating the semantic identifier with this parameter of the new field device as part of the sought configuration information for the new field device, wherein the evaluating to which extent existing parameter information matches new parameter information for a parameter comprises:

providing a set of criteria for the match between the existing parameter information and the new parameter information, wherein each criterion is associated with a confidence level for the match, and/or with an increase or decrease of this confidence level;

checking whether each criterion is fulfilled; and in response to a criterion being fulfilled, applying the confidence level, and/or the increase or decrease of the confidence level, associated with the criterion, and wherein the set of criteria comprises at least the criterion that when a same parameter is associated with the semantic identifier with respect to multiple field devices, the confidence level is increased.

* * * * *